(12) United States Patent
Holle et al.

(10) Patent No.: US 8,046,600 B2
(45) Date of Patent: Oct. 25, 2011

(54) COLLABORATIVE POWER SHARING BETWEEN COMPUTING DEVICES

(75) Inventors: Matthew H. Holle, Kirkland, WA (US); Stephen R. Berard, Seattle, WA (US); Sean N. McGrane, Sammamish, WA (US); John M. Parchem, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 665 days.

(21) Appl. No.: 11/927,464

(22) Filed: Oct. 29, 2007

(65) Prior Publication Data

US 2009/0113221 A1    Apr. 30, 2009

(51) Int. Cl.
*G06F 1/26* (2006.01)
(52) U.S. Cl. ........ 713/300; 713/310; 713/320; 713/321; 713/322; 713/323; 713/324; 713/330; 713/340
(58) Field of Classification Search .................. 713/300, 713/310, 320–324, 330, 340
See application file for complete search history.

(56) References Cited

U.S. PATENT DOCUMENTS

| | | | | |
|---|---|---|---|---|
| 7,461,273 B2 * | 12/2008 | Moore et al. | .................. | 713/300 |
| 7,461,274 B2 * | 12/2008 | Merkin | .................. | 713/300 |
| 7,702,931 B2 * | 4/2010 | Goodrum et al. | ............. | 713/300 |
| 7,739,548 B2 * | 6/2010 | Goodrum et al. | .............. | 714/20 |
| 2005/0076251 A1 * | 4/2005 | Barr et al. | ..................... | 713/300 |
| 2005/0138440 A1 * | 6/2005 | Barr et al. | ..................... | 713/300 |
| 2007/0050644 A1 * | 3/2007 | Merkin | .................. | 713/300 |
| 2008/0010521 A1 * | 1/2008 | Goodrum et al. | .............. | 714/22 |
| 2008/0178029 A1 * | 7/2008 | McGrane et al. | ............. | 713/324 |
| 2009/0044036 A1 * | 2/2009 | Merkin | .................. | 713/340 |

* cited by examiner

*Primary Examiner* — M Elamin
(74) *Attorney, Agent, or Firm* — Woodcock Washburn LLP

(57) ABSTRACT

A plurality of power budgets are sent to a corresponding plurality of power consumers by a power management point, wherein a total power budget managed by the power management point includes a sum of the plurality of power budgets and an available power budget not assigned to the plurality of power consumers. An additional power request having a power increase amount is received from a first power consumer of the plurality of power consumers. The additional power request is approved when the power increase amount does not exceed the available power budget. The available power budget is decreased by the power increase amount. An approval of the additional power request is sent to the first power consumer.

20 Claims, 6 Drawing Sheets

| TIME | SERVER 1 (init 250W) | SERVER 2 (init 350W) | MNGT POINT (init 1000W) |
|---|---|---|---|
| T0 | Requests 75W. | | |
| T1 | | | Receives request for 75W. |
| T2 | Receives approval. | | |
| T3 | | Requests add'l 350W. | |
| T4 | | | Receives req. for 350W. |
| T5 | | Receives denial. | |
| T6 | Requests return of 100W. | | |
| T7 | | | Receives return of 100W. |
| T8 | Receives ack of return. | | |
| T9 | | Requests add'l 350W. | |
| T10 | | | Receives req. for 350W. |
| T11 | | Receives approval. | |
| T12 | | Requests return of 350W. | |
| T13 | | | Receives return of 350W. |
| T14 | | Receives ack of return. | |

COLLABORATIVE POWER SHARING BETWEEN COMPUTING DEVICES

BACKGROUND

Organizations often use datacenters to house computer systems and associated support devices, such as storage and communications equipment. Today, many organizations are unable to expand their computing capacity because they are constrained by their ability to power and cool additional equipment in their datacenters. Also, adding computing systems may increase datacenter utility costs as well as increase a datacenter's environmental footprint.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to collaborative power sharing between computing devices. Multiple computing devices share a single power budget that is administered by a power management point. As one computing device lowers its power consumption, other computing devices are able to use this extra power to raise their respective power consumption and consequently their performance capabilities.

Many of the attendant features will be more readily appreciated by reference to the following detailed description considered in connection with the accompanying drawings.

BRIEF DESCRIPTION OF THE DRAWINGS

Like reference numerals are used to designate like parts in the accompanying drawings.

FIG. 4 is a timeline of events for collaborative power sharing in accordance with an embodiment of the invention.

DETAILED DESCRIPTION

Figure 1:
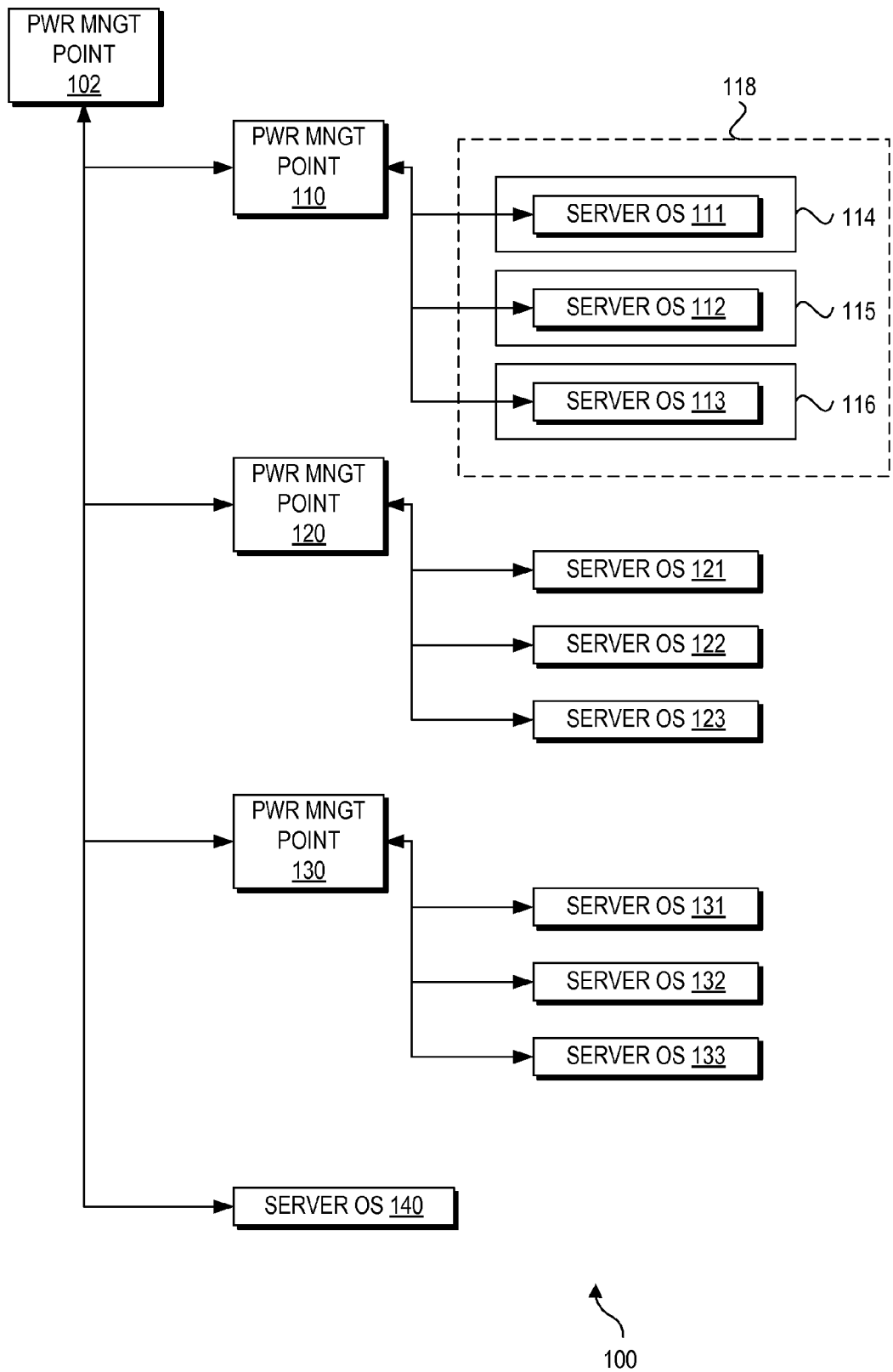
FIG. 1 is a block diagram of a computing environment for collaborative power sharing in accordance with an embodiment of the invention.

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Embodiments of the invention provide power management techniques that maximize compute power-efficiency within an existing infrastructure. In other words, additional computing can be achieved without requiring additional power or cooling infrastructure. This provides significant benefits to the customer in terms of reducing costs, increasing flexibility, and lower environmental impact.

Some operating systems, such as Microsoft Windows®, are very effective at maximizing efficiency within the bounds of a single platform, but current technology does not address the situation where massive numbers of machines are all sharing the same infrastructure. Embodiments herein provide a mechanism where power and cooling resources are coordinated across collections of machines. This enables maximizing compute yield within existing capacity limits in a reliable and predictable manner.

Building a computing datacenter requires an extremely large investment. Aside from the physical building, power and cooling infrastructure requirements can be prohibitively expensive. In order to ensure reliability, datacenter operators provide power and cooling for "worst-case scenarios". They often inspect a physical computer to see what its maximum power consumption can be and assume that it's always using that much power.

As an example, assume a system administrator has a number of identical server systems, each capable of consuming between 300 Watts (W) and 600 W (depending on performance demands at a particular time). Now assume a system administrator is populating a server cabinet which can supply 2.5 Kilowatts (KW). A conservative practice will allow 4 servers to be placed in the cabinet (4×600 W=2.4 KW). Any additional servers will require a new cabinet, more floor space, and additional cooling and power. Embodiments of the invention allow datacenters to continue to leverage their existing infrastructure and avoid the costs of building additional facilities. In the example above, additional servers may be placed into the 2.5 KW server cabinet with minimal impact on overall computing performance.

Embodiments of the invention use demand-based performance to manage power consumption of large groupings of systems. As an example, consider the case where two servers, server1 and server2, sit alone in a cabinet. Assuming the total power capacity of the cabinet is limited to 1000 Watts (W), and each server draws between 200 W and 700 W. Both servers cannot operate at peak levels (i.e., 700 W) at the same time because the cabinet is limited to 1000 W total. However, under typical circumstances both servers will not simultaneously require peak power. In general, it is undesirable and not scalable to burden a server operating system with understanding or knowledge of neighboring systems.

In embodiments herein, an arbiter, which is referred to herein as a "power management point", provides power management across multiple computing devices. In one embodiment, a power management point is part of an Information Technology (IT) management system, such as Microsoft® System Center. A power management point allocates power budgets on a server-by-server basis, and also approves/denies requests for budget adjustments. Individual servers interpret their power budget as a limit of acceptable power draw, and it is assumed that they will operate within this limit. Going back to the previous example, as server1 lowers its budget, server2 is able to increase its budget, and vice-versa. Budgets may be adjustable by any increment; each individual server requests increases/decreases at a granularity appropriate for its unique configuration.

Turning to FIG. 1, a computing environment 100 in accordance with an embodiment of the invention is shown. In one embodiment, computing environment 100 includes a datacenter. Computing environment 100 includes a power management point 102 connected to a collection of power consumers which includes power management points 110, 120, 130 and a server Operating System (OS) 140. In turn, power management point 110 budgets power to server OSs 111-113, power management point 120 budgets power to server OSs 121-123, and power management point 130 budgets power to server OSs 131-133. In one embodiment, server OSs 111-113, 121-123, and 131-133 are each executing on their own server in three separate server cabinets. Also in this particular embodiment, power management points 110, 120, and 130 each manage the power to one of the three cabinets. For example, in FIG. 1, server OS 111 is executed by server 114, server OS 112 is executed by server 115, and server OS 113 is executed by server 116. Servers 114-116 reside in a single cabinet 118. One skilled in the art having the benefit of this description will appreciate that the arrangement of components shown in FIG. 1 is an example for the sake of discussion and that embodiments herein are not limited to this arrangement.

In one embodiment, a power management point or a server OS may be executing on a computing device. An example computing device is discussed below in conjunction with FIG. 6. Additionally, in some embodiments, a power management point may be executing on the same computing device that is also executing a server OS. Further, while the embodiment of FIG. 1 shows power management of server operating systems, it will be understood that other types of operating systems may be used.

Each power management point is allocated a power budget, which is then divided and applied to its power consumers (e.g., other power management points and/or server operating systems) within its collection. The power management point then tracks adjustments and is able to service budgetary requests accordingly. As an example, given a management point with 1 KW power capacity remaining, a request for an additional 200 W would be approved. The remaining power capacity would then be updated to 800 W. Consequently, power could also be returned to the management point and added back into the pool of remaining power capacity.

Embodiments of the invention allow for power management points to be cascaded and arranged in meaningful ways. For example, a management point may be assigned to every server rack in a row. An additional management point may then be applied to manage the group of rack management points. Taking this example further, another management point may then manage the management points that manage the rows of racks. In another example, a management point may be employed against a set of blades within a chassis.

In one embodiment, each server OS is allocated a power budget by its associated power management point. The server OS is responsible for monitoring its system's consumption and enforcing its budget. As an example, the operating system may detect that its power draw is approaching its limit and may decide to reduce processor performance and power down an unused USB controller to ensure it stays within its budget. This enables the high-level management solution to leverage improvements in platform and OS technologies without requiring changes to the power management point software.

As workload increases, the server OS may approach its budget limit. When this situation arises, the operating system may request a specific increase to its budget. This allows the OS to scale performance upwards when sufficient capacity exists without negatively affecting neighboring systems. The OS may determine the required budgetary increase to meet the current demand. For example, for a CPU-bound task, the OS may determine that 20 W is all that's required to reach maximum performance. Therefore, it makes a request of 20 W to the power management point. Thus, the OS maintains the ability to make power consumption adjustments to its own platform. The OS is only constrained by the total power budget of its associated power management point.

When the operating system is consuming less power than budgeted, it can return the excess back to the power management point for possible reallocation to a different system. There's also opportunity here for the operating system to apply unique logic when deciding how much and when to return budget to the power management point. For example, hysteresis could be used to detect cyclic workloads where budgets are repetitively being raised and lowered. In order to reduce latencies, the OS could decide to simply hold its excess budget in anticipation of a spike in its workload.

In one embodiment, an OS may be part of a virtual machine environment. In this embodiment, a hypervisor (also known as a virtual machine monitor) supports two or more operating systems each executing in respective virtual machines. In one implementation, the root partition on a server handles the power management budgeting for the virtual machine environment and communicates with a power management point. The root partition works alongside the hypervisor to manage the physical hardware of the server. In another implementation, the hypervisor manages the power budget for the virtual machine environment and communicates with the power management point.

In one embodiment, power includes the power to operate cooling equipment associated with one or more computing devices. For example, a datacenter may include multiple cabinets that each have their own associated cooling equipment. The power to the cooling equipment may be budgeted and cascaded using power management points. Cooling logic at each cabinet may request power budget increases/decreases as described herein. In one embodiment, cooling may be metered in watts.

In one embodiment, a power communication channel between a power management point and its consumers is used for communications (e.g., additional power request). In one embodiment, the power communication channel is in compliance with a Distributed Management Task Force specification. In another embodiment, power related communications are conducted using other well-known computer management communication channels.

Figure 2:
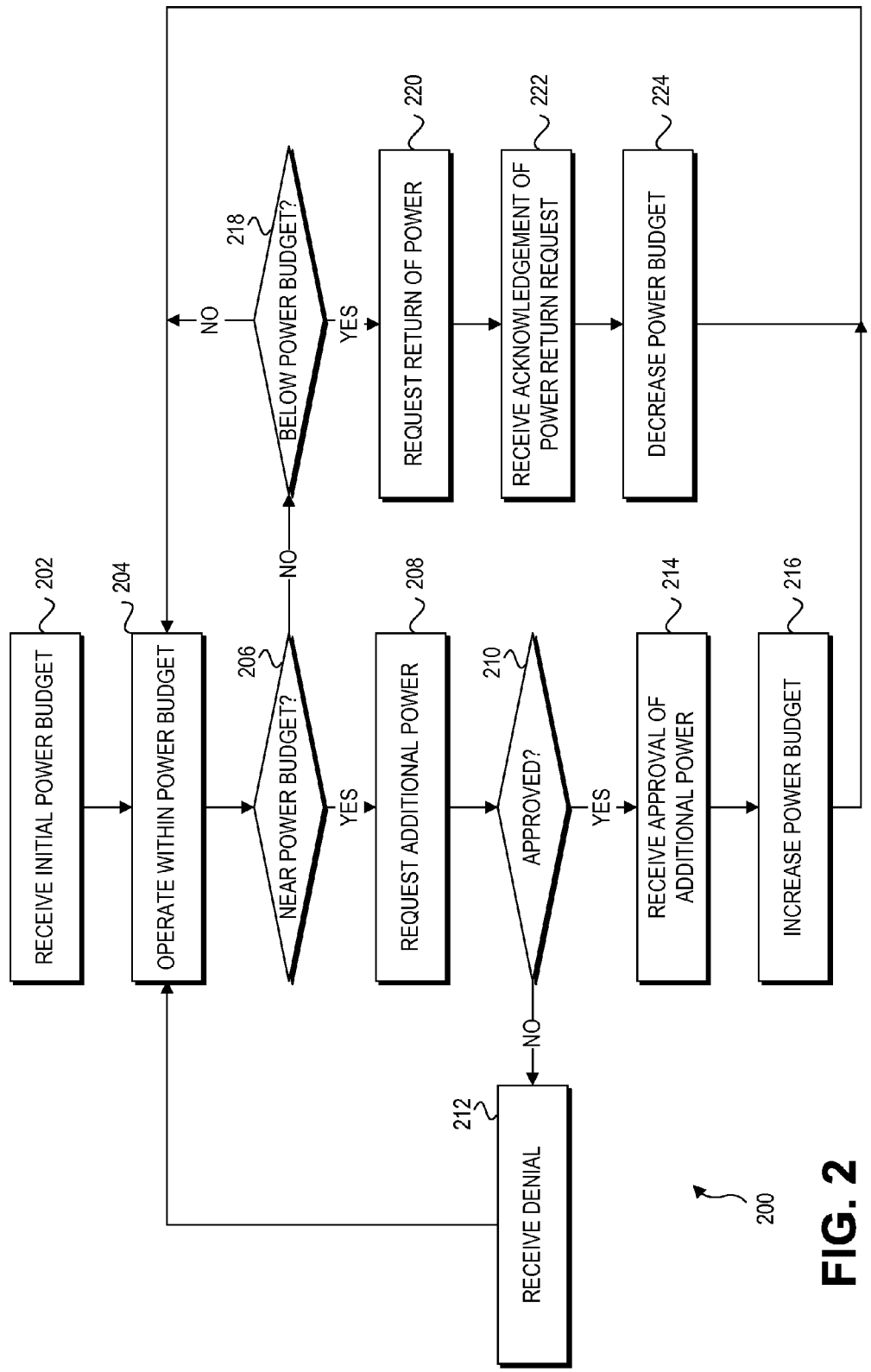
FIG. 2 is a flowchart showing operations of collaborative power sharing in accordance with an embodiment of the invention.

Turning to FIG. 2, a flowchart 200 shows operations of collaborative power sharing from the perspective of a power consumer (e.g., an operating system or a cascaded power management point) in accordance with an embodiment of the invention. In one embodiment, at least a portion of flowchart 200 may be implemented by computer readable instructions executable by one or more computing devices.

Starting with operation 202, the power consumer receives an initial power budget from its associated power management point. Next, in operation 204, the power consumer operates within its initial power budget. Next, in operation 206, the power consumer determines if it is operating near its power budget limit. In one embodiment, the power consumer determines if it is operating at a threshold amount, such as 95% or more of its power budget.

If the power consumer determines it needs more power, then the logic proceeds to operation 208 where the power consumer makes a request to its power management point for additional power. In one embodiment, the consumer requests a certain power increase amount. At operation 210, the power management point determines if the additional power request is approved or denied. If the request is denied, then the consumer receives a denial response from the power management point, as shown by operation 212. The logic then returns to operation 204 where the power consumer continues operating within its current power budget.

If the request for additional power is approved, the power consumer receives an approval to use additional power (operation 214) and increases its power budget accordingly (operation 216). The logic then returns to operation 204 where the power consumer operates within the increased power budget.

Referring again to operation 206, if the power consumer is not operating near its power budget, the logic proceeds to operation 218 to determine if the power consumer is operating far enough below its power budget for a power budget reduction. In one embodiment, the power consumer determines if it is operating at a threshold amount, such as 75% or less of its power budget. If the power consumer is not far enough below its power budget for a power budget reduction, then the logic returns to operation 204 to continue operating within the current power budget.

If the power consumer determines that it may operate with less power, then the logic proceeds to send a power return request to the power management point, as shown by operation 220. Next, the power consumer receives an acknowledgement from the power management point for the power return request (operation 222) and decreases its power budget accordingly (operation 224). The logic then proceeds back to operation 204 where the power consumer operates within this decreased power budget.

Figure 3:
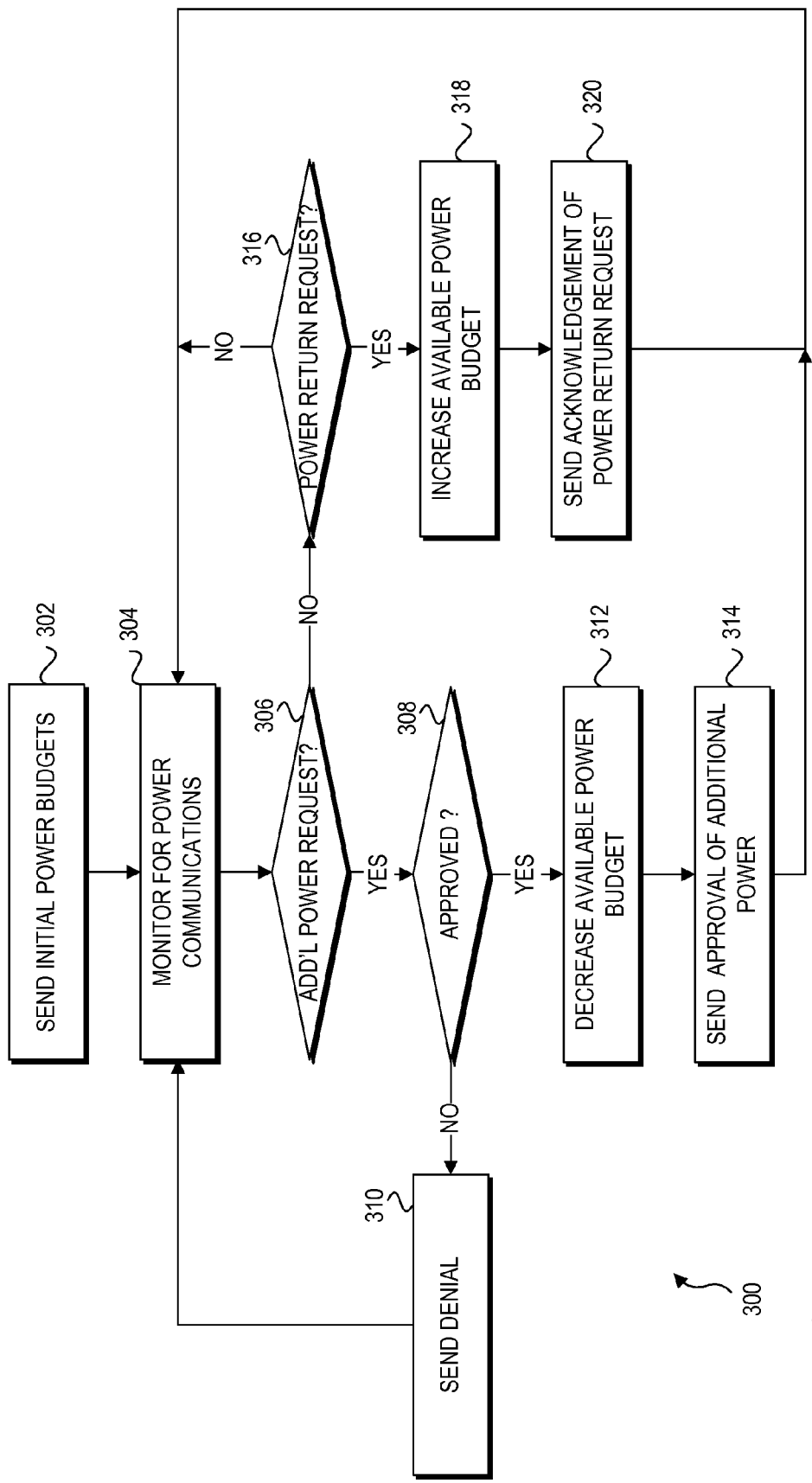
FIG. 3 is a flowchart showing operations of collaborative power sharing in accordance with an embodiment of the invention.

Turning to FIG. 3, a flowchart 300 shows operations of collaborative power sharing from the perspective of a power management point in accordance with an embodiment of the invention. In flowchart 300, the power management point manages power change requests from power consumers in its collection. These consumers may include one or more power management points, one or more operating systems, or any combination thereof. In one embodiment, at least a portion of flowchart 300 may be implemented by computer readable instructions executable by one or more computing devices.

Starting with operation 302, a power management point sends an initial power budget to each of its power consumers. Next, in operation 304, the power management point monitors for communications from any of the power consumers in its collection. When a communication is received, the power management point determines if the communication is a request for additional power, as shown in operation 306. If the answer is yes, the logic proceeds to operation 308 to determine if the additional power request is approved. In one embodiment, the additional power request is approved when the request does not exceed the available power budget for the power management point. In another embodiment, the additional power request is approved even though the requested power amount is more than the available power amount when the requesting power consumer has power priority over other power consumers in the collection (discussed further below in connection with FIG. 5).

If the additional power request is not approved (e.g., the power increase amount of the additional power request exceeds the available power budget), then the power management point sends a denial response to the power consumer, as shown by operation 310. The logic then returns to operation 304.

If the additional power request is approved (e.g., the request is within the power management point's available power budget), then the power management point decreases its available power budget by the power increase amount in the additional power request (operation 312) and sends an approval to the power consumer (operation 314). The logic then returns to operation 304 to monitor for more communications.

Referring again to operation 306, if the communication was not a request for additional power, then the logic determines if the communication is a power return request, as shown by operation 316. If the communication is not a power return request, then the logic returns to operation 304.

If the communication was a power return request, then the power management point increases its available power budget by the power decrease amount indicated in the power reduction request (operation 318) and sends an acknowledgement of the power return request to the power consumer (operation 320). The logic then returns to operation 304 to monitor for more communications from power consumers.

Turning to FIG. 4, timeline of events 400 for collaborative power sharing between two servers (server1 and server2) and a power management point in accordance with an embodiment of the invention is shown. This example illustrates the steps and timeline associated with two servers utilizing a shared power budget. While the term server is used in this example, it will be appreciated that a server OS may manager power at each server and interact with the power management point.

Timeline 400 has four columns: time, server1 activity, server2 activity, and power management point activity. Server1 is initialed allocated 250 W, server2 is initialed allocated 350 W, and the power management point has a total power budget of 1000 W (400 W remaining after initial allocation to server1 and server2).

At time T0, server1 detects its power draw is approaching 250 W and requests an additional 75 W. At time T1, the management point receives the additional power request from server1. Since the 75 W request is within the remaining 400 W budget of the power management point, the power management point reduces its available power budget to 325 W and sends approval to server1. At time T2, server1 receives approval for the 75 W increase. Server1's power budget is now 325 W. Server1's performance is increased to meet work demands.

At time T3, server2 detects it power draw is approaching 350 W and requests an additional 350 W from the power management point. At time T4, the power management point receives server2's request for 350 W. Since the 350 W request exceeds the available power of 325 W at the power management point, the request is denied. At time T5, server2 receives the denial for additional power. Server2's power budget remains at 350 W. In one embodiment, server2 may make another request for a lesser amount of additional power in order to attempt to increase performance. Server2 has the freedom to determine what amount of power increase will result in a meaningful performance increase.

At time T6, the workload at server1 drops and the associated power draw drops to 200 W. Server1 then requests a return of 100 W to the power management point. At time T7, the power management point receives the power return request and increases its total available power to 425 W. The power management point sends an acknowledgement of the power return and the acknowledgement is received by server1 at time T8.

At time T9, server2 detects its power draw is still close to its current 350 W budget and again requests an additional 350 W from the power management point. At time T10, the power management point receives the request from server2. Since the 350 W request is within the power management point's current available power budget of 425 W, the request is approved. The power management point decrements its available power budget to 75 W and sends approval to server2. At time T11, server2 receives the power increase approval and changes its power budget to 700 W.

At time T12, the workload at server2 drops so server2 requests a return of 350 W. At time T13, the power management point receives the power return request and increases its available power budget by 350 W to a total of 425 W. At time T14, server2 receives acknowledgement of its lowered power budget to 350 W.

The example shown in FIG. 4 demonstrates various aspects of embodiments of the invention. Even very small increments of power can be shared among the servers (using the power management point for coordination). As a small bit of power is relinquished by a server, it can be distributed to another server (for example, among 20 servers in a rack).

The server OS is free to innovate with regard to meeting its power budget. For example, at time T5 when server 2 is denied its request, the server OS is faced with a choice. It can either continue to operate as is (and continue to limit functionality or performance in order to meet budget), or it can perhaps further limit some small bit of functionality or performance in one component in order to better utilize the 350 W budget that it already has (e.g., turn on Active State Power Management (ASPM) on the PCI-Express bus in order to allow a small increase in processor frequency). Thus, the server OS maintains the ability to make power budget decisions at the individual platform level. Also, this enables hardware changes, software changes (e.g., updates) at the individual server level without necessitating changes to the collaborative power sharing framework.

Embodiments of the invention include alerts, events and reporting associated with power consumption. This may be used to detect areas of mis-configuration and capacity management. For example, a log may track when a server OS requests additional power and analysis may determine if these additional power requests are associated with any particular event. With this knowledge, the power budgets at the management point level may be modified to accommodate this known event at the server.

In one embodiment, operating systems managed by a power management point may have different power budget prioritizations. For example, the servers in a cabinet may be prioritized such that when a specific server requests an increase in its power budget, it is guaranteed to receive a positive reply. This would require that some other server in the cabinet would be forced to lower its budget (and possible performance levels) accordingly. In one embodiment, the power management point may request that a server OS lower its power budget to accommodate a power increase to a higher priority server OS. In some cases, a reduction request may be issued forcefully to one or more server OSs (e.g. a power failure that causes a temporary reduction in the total power budget for the power management point).

Figure 5:
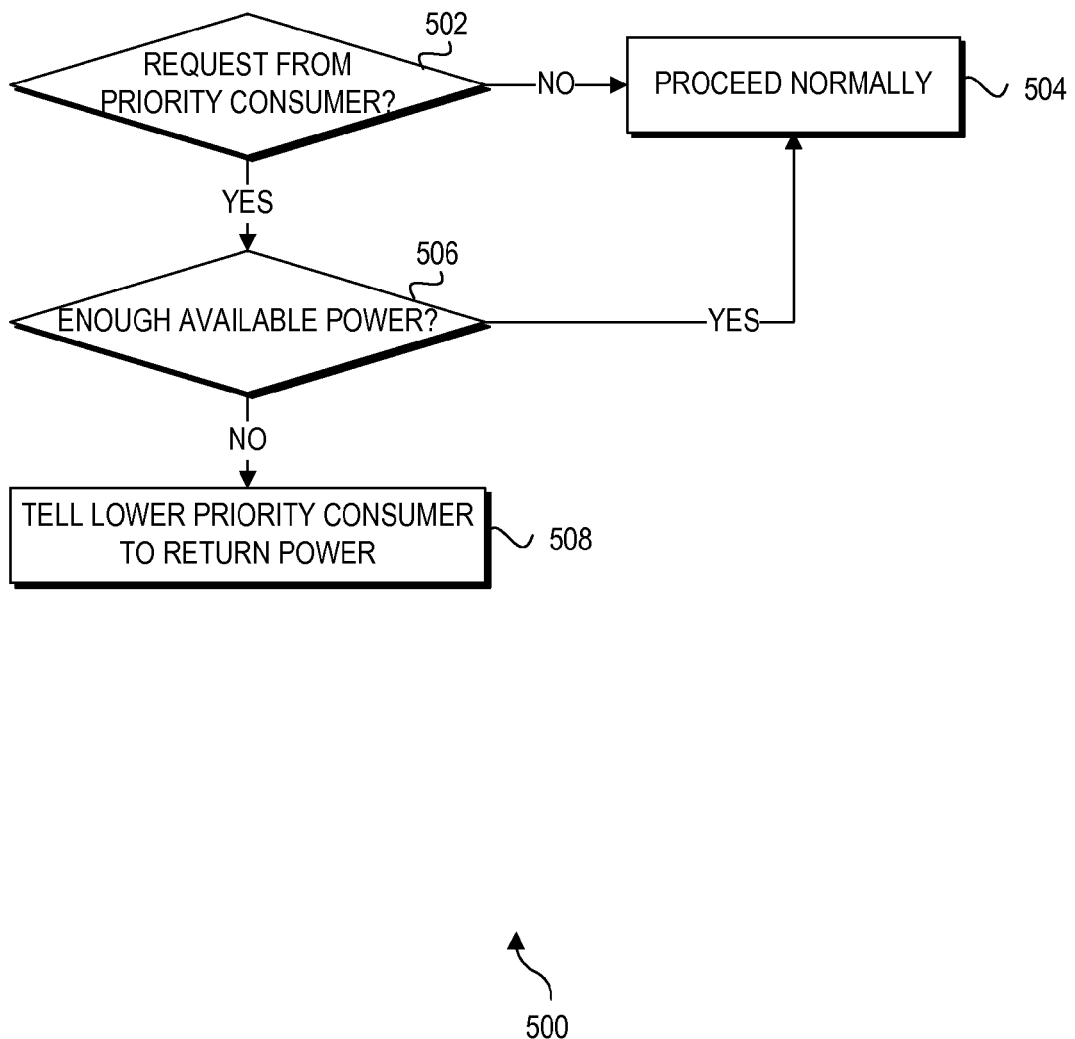
FIG. 5 is a flowchart showing operations of prioritization in collaborative power sharing in accordance with an embodiment of the invention.

Referring to FIG. 5, an embodiment of prioritization in collaborative power sharing is shown by a flowchart 500. In one embodiment, at least a portion of flowchart 500 may be implemented by computer readable instructions executable by one or more computing devices. Starting at operation 502, the power management point determines if the additional power request was received from a priority power consumer. If the answer is no, then the additional power request is handled normally, as shown by operation 504. If the request was received from a priority consumer, then the logic proceeds to operation 506.

At operation 506, the power management point determines if there is enough available power to fill the additional power request. If the answer is yes, then the logic proceeds to operation 504. If the answer is no, then the logic proceeds to operation 508 where a lower priority consumer is told to return power so that the power management point can fulfill the additional power request from the higher priority consumer. For example, an additional power request may be approved when the power increase amount exceeds the available power budget by an over-budget amount because a higher priority server has priority over a lower priority server. The power management point tells the lower priority server to decrease its power budget by the over-budget amount. This over-budget amount is then available to be re-assigned to the higher priority server. The power management point then lowers its available power budget by the power increase amount in the original additional power request.

It will be appreciated that embodiments herein improve over solutions that simply cap performance levels on all servers in a cabinet. These cap implementations waste the power capacity delta between what the server actually consumes and what is currently budgeted. With embodiments herein, all the servers are capable, at one time or another, of reaching full performance, thus ensuring the work gets done and taking full advantage of the hardware purchased.

Using the example in FIG. 4, the servers could all be capped at 300 W in order to ensure the overall budget is met. This is extremely limiting because it means the full capabilities of the servers cannot be met. In this cap solution, customers pay for high-end systems, but only get very limited capabilities. Embodiments described herein allow customers to further populate their server cabinets while still getting full use of the systems they have purchased.

Embodiments of the invention provide collaborative power sharing for computing environments, such as a datacenter. A power budget may be shared in very fine-grained increments among a collection of computing devices. Performance does not have to suffer since individual computing devices are capable of reaching full performance when sufficient power capacity exists. Embodiments herein allow an OS to retain management of its platform's power consumption on an individual machine level.

Figure 6:
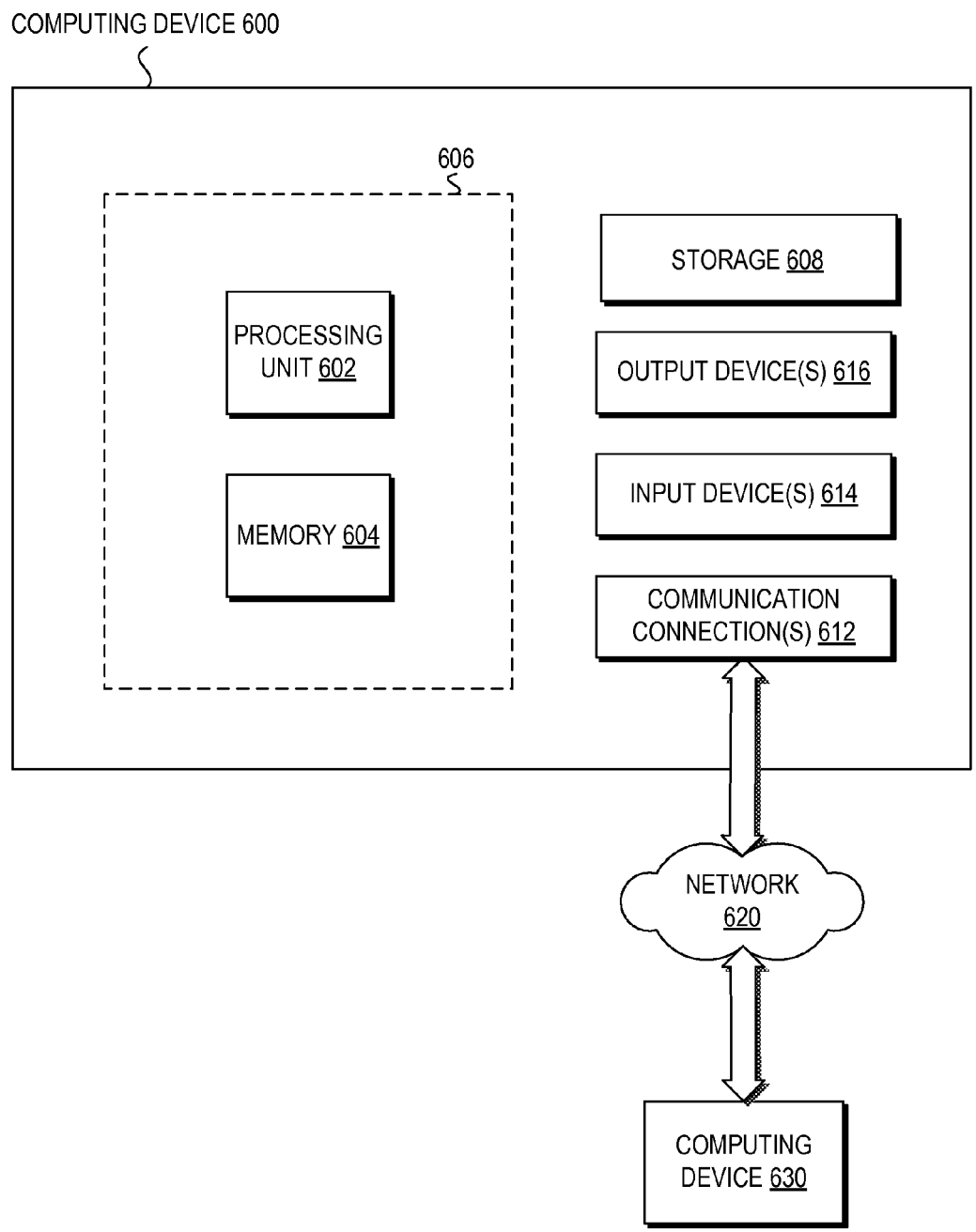
FIG. 6 is a block diagram of an example computing device for implementing embodiments of the invention.

FIG. 6 and the following discussion provide a brief, general description of a suitable computing environment to implement embodiments of the invention. The operating environment of FIG. 6 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 shows an example of a computing device 600 for implementing one or more embodiments of the invention. In one configuration, computing device 600 includes at least one processing unit 602 and memory 604. Depending on the exact configuration and type of computing device, memory 604 may be volatile (such as RAM), non-volatile (such as ROM, flash memory, etc.) or some combination of the two. This configuration is illustrated in FIG. 6 by dashed line 606.

In other embodiments, device 600 may include additional features and/or functionality. For example, device 600 may also include additional storage (e.g., removable and/or non-removable) including, but not limited to, magnetic storage, optical storage, and the like. Such additional storage is illustrated in FIG. 6 by storage 608. In one embodiment, computer readable instructions to implement embodiments of the invention may be in storage 608. For example, storage 608 may have stored computer readable instructions to implement a power management point and/or operating system power management as described above. Storage 608 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 604 and storage 608 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 600. Any such computer storage media may be part of device 600.

Device 600 may also include communication connection(s) 612 that allow device 600 to communicate with other devices. Communication connection(s) 612 may include, but is not limited to, a modem, a Network Interface Card (NIC), an integrated network interface, a radio frequency transmitter/receiver, an infrared port, a USB connection, or other interfaces for connecting computing device 600 to other computing devices. Communication connection(s) 612 may include a wired connection or a wireless connection. Communication connection(s) 612 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 600 may include input device(s) 614 such as keyboard, mouse, pen, voice input device, touch input device, infrared cameras, video input devices, and/or any other input device. Output device(s) 616 such as one or more displays, speakers, printers, and/or any other output device may also be included in device 600. Input device(s) 614 and output device(s) 616 may be connected to device 600 via a wired connection, wireless connection, or any combination thereof. In one embodiment, an input device or an output device from another computing device may be used as input device(s) 614 or output device(s) 616 for computing device 600.

Components of computing device 600 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 600 may be interconnected by a network. For example, memory 604 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 630 accessible via network 620 may store computer readable instructions to implement one or more embodiments of the invention. Computing device 600 may access computing device 630 and download a part or all of the computer readable instructions for execution. Alternatively, computing device 600 may download pieces of the computer readable instructions, as needed, or some instructions may be executed at computing device 600 and some at computing device 630. Those skilled in the art will also realize that all or a portion of the computer readable instructions may be carried out by a dedicated circuit, such as a Digital Signal Processor (DSP), programmable logic array, and the like.

In one implementation, a method may include sending a plurality of power budgets to a corresponding plurality of power consumers by a power management point, wherein a total power budget managed by the power management point includes a sum of the plurality of power budgets and an available power budget not assigned to the plurality of power consumers; receiving an additional power request having a power increase amount from a first power consumer of the plurality of power consumers; approving the additional power request when the power increase amount does not exceed the available power budget; decreasing the available power budget by the power increase amount; and sending an approval of the additional power request to the first power consumer. The first power consumer may include one of an operating system, a power management point, a hypervisor, or a root partition that supports a virtual machine environment. The method may include denying the additional power request when the power increase amount exceeds the available power budget; and sending a denial of the additional power request to the first power consumer. The method may include receiving a power return request having a power decrease amount from the first power consumer; increasing the available power budget by the power decrease amount; and sending an acknowledgement of the power return request to the first power consumer. The method may include receiving a first power budget at the first power consumer, the first power consumer to operate within the first power budget. The method may include sending the additional power request to the power management point from the first power consumer; receiving the approval of the additional power request from the power management point; and increasing a first power budget at the first power consumer by the power increase amount. The method may include sending the additional power request to the power management point from the first power consumer; receiving a denial of the additional power request from the power management point; and operating the first power consumer at its current power budget. The method may include approving the additional power request when the power increase amount exceeds the available power budget by an over-budget amount because the first power consumer has priority over a second power consumer of the plurality of power consumers; telling the second power consumer to decrease its power budget by the over-budget amount; and decreasing the available power budget by the power increase amount. The total power budget may be associated with powering the plurality of power consumers, powering cooling equipment for the power consumers, or any combination thereof.

In one implementation, one or more computer readable media may include computer readable instructions that when executed by a computing device perform operations comprising: receiving a power budget from a power management point; operating the computing device within the power budget; requesting an increase to the power budget by a power increase amount from the power management point; receiving approval of the increase to the power budget from the power management point; increasing the power budget by the power increase amount; and operating the computing device within the increased power budget. The operations may include determining that the computing device is operating below the power budget by a threshold. The operations may include determining that the computing device is operating below the power budget by a threshold; requesting an increase to the power budget by a first power increase amount from the power management point; receiving a denial of the increase to the power budget from the power management point; and operating the computing device within the power budget. The operations may include determining that the computing device is operating below the power budget by a threshold; requesting an increase to the power budget by a first power increase amount from the power management point; receiving a denial of the increase to the power budget from the power management point; operating the computing device within the power budget; and re-requesting an increase to the power budget from the power management point by a second power increase amount less than the first power increase amount. The operations may include sending a power return request having a power decrease amount to the power management point to decrease the power budget; receiving an acknowledgment of the power return request from the power management point; decreasing the power budget by the power decrease amount; and operating the computing device within the decreased power budget. The operations may include sending a power return request having a power decrease amount to the power management point to decrease the power budget; receiving an acknowledgment of the power return request from the power management point; decreasing the power budget by the power decrease amount; operating the computing device within the decreased power budget determining that the computing device is operating below the power budget by a threshold.

One implementation includes a system for managing power at a datacenter, comprising: a power management point to manage a total power budget shared by a plurality of server operating systems, wherein the total power budget includes an available power budget of power not assigned to the plurality of server operating systems; and the plurality of server operating systems each communicatively coupled to the power management point, each server operating system to operate within a power budget assigned by the power management point. In some cases, the power management point to approve an additional power request having a power increase amount from a first server operating system of the plurality of server operating systems when the power increase amount does not exceed the available power budget; and the power management point to decrease the available power budget by the power increase amount. In some cases, the power management point to deny an additional power request having a power increase amount from a first server operating system of the plurality of server operating systems when the power increase amount exceeds the available power budget. In some cases, the power management point to receive a power return request having a power decrease amount from a first operating system of the plurality of operating systems; and the power management point to increase the available power budget by the power decrease amount. In some cases, the power management point to approve an additional power request having a power increase amount from a first server operating system of the plurality of server operating systems when the first server operating system has priority over a second server operating system of the plurality of server operating systems, wherein the power increase amount is more than the available power budget by an over-budget amount; the power management point to tell the second server operating system to decrease its power budget by the over-budget amount; and the power management point to decrease the available power budget by the power increase amount.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. One or more computer readable storage media including computer readable instructions that when executed by a computing device perform operations comprising:
    operating the computing device within a power budget from a power management point;
    requesting, from the power management point, a first increase to the power budget by a first power increase amount;

re-requesting, from the power management point and based on a denial of the first increase, a second increase to the power budget by a second power increase amount, the second power increase amount less than the first power increase amount;

determining if the second increase to the power budget from the power management point was approved;

when the second increase was approved, increasing the power budget by the second power increase amount; and when the second increase was approved, operating the computing device within the increased power budget.

2. The one or more computer readable storage media of claim 1 wherein the computer readable instructions when executed further perform operations comprising:

sending a power return request having a power decrease amount to the power management point to decrease the power budget;

receiving an acknowledgment of the power return request from the power management point;

decreasing the power budget by the power decrease amount; and operating the computing device within the decreased power budget.

3. The one or more computer readable storage media of claim 2 wherein the computer readable instructions when executed further perform operations comprising:

determining that the computing device is operating below the power budget by a threshold.

4. A system for managing power at a datacenter, comprising:

a power management point to manage a total power budget shared by a plurality of server operating systems, wherein the total power budget includes an available power budget of power not assigned to the plurality of server operating systems; and the plurality of server operating systems each communicatively coupled to the power management point, each server operating system configured to operate within a power budget assigned by the power management point, the power management point configured:

to approve an additional power request having a power increase amount from a first server operating system of the plurality of server operating systems when the first server operating system has priority over a second server operating system of the plurality of server operating systems, wherein the power increase amount is more than the available power budget by an over-budget amount;

to tell the second server operating system to decrease its power budget by the over-budget amount; and to decrease the available power budget by the power increase amount.

5. The system of claim 4, the first server operating system executing in a first virtual machine, the second server operating system executing in a second virtual machine.

6. The system of claim 5 further comprising a hypervisor to support the first virtual machine and the second virtual machine.

7. The system of claim 6, the power management point including at least one of a root partition or the hypervisor.

8. The system of claim 4 wherein the power management point is further configured:

to receive a power return request having a power decrease amount from the plurality of operating systems; and to increase the available power budget by the power decrease amount.

9. A method, comprising:

determining, by a power management point, if a request to increase a first power budget by a power increase amount exceeds an available power budget, the first power budget for a first power consumer, the first power budget associated with a virtual machine environment, the virtual machine environment comprising at least two virtual machines, the at least two virtual machines supported by a hypervisor, the power management point managing a total power budget, the total power budget including two or more allocated power budgets and the available power budget, the available power budget not including the allocated power budgets; and when the request does not exceed the available power budget, approving the increase to the first power budget.

10. The method of claim 9 wherein:

the power management point includes at least one of a hypervisor or a root partition, the power management point is configured to manage the power management budgeting for the virtual machine environment.

11. The method of claim 10 wherein:

the power management point is configured to manage a physical hardware associated with the virtual machine environment.

12. The method of claim 9, wherein:

the total power budget of the power management point is a one of a second plurality of power budgets corresponding to a second plurality of power consumers managed by a second power management point.

13. The method of claim 9, wherein the total power budget is associated with powering cooling equipment for at least one of the plurality of power consumers.

14. The method of claim 9, wherein the first power consumer is a first virtual machine of the at least two virtual machines.

15. The method of claim 9, wherein the first power consumer is a first operating system executing in a first virtual machine of the at least two virtual machines.

16. The method of claim 15, wherein the first operating system is configured to determine a specific budgetary increase, the power increase amount based on the specific budgetary increase.

17. The method of claim 9, further comprising:

determining, by a power management point, the first power consumer was a priority power consumer; and when the request exceeds the available power budget, telling a lower priority power consumer to return power.

18. The method of claim 17, wherein the first power consumer comprises a first operating system executing in a first virtual machine of the at least two virtual machines.

19. The method of claim 17, wherein the lower priority power consumer comprises a second operating system executing in a second virtual machine of the at least two virtual machines.

20. The method of claim 17, wherein:

the first power consumer comprises a first operating system executing in a first virtual machine of the at least two virtual machines, and the lower priority power consumer comprising a second operating system executing in a second virtual machine of the at least two virtual machines.

* * * * *